(12) United States Patent
Glaubitt et al.

(10) Patent No.: US 7,575,809 B2
(45) Date of Patent: Aug. 18, 2009

(54) GLASS HAVING A POROUS ANTI-REFLECTION SURFACE COATING AND METHOD FOR PRODUCING SUCH GLASS

(75) Inventors: Walther Glaubitt, Margetshoechheim (DE); Monika Kursawe, Seeheim-Jugenheim (DE); Andreas Gombert, Freiburg (DE); Thomas Hofmann, Fuerth (DE)

(73) Assignee: Flabeg Solarglas GmbH & Co. KG, Fuerth (DE)

( * ) Notice: Subject to any disclaimer, the term of this patent is extended or adjusted under 35 U.S.C. 154(b) by 634 days.

(21) Appl. No.: 10/490,172

(22) PCT Filed: Sep. 19, 2002

(86) PCT No.: PCT/EP02/10495

§ 371 (c)(1),
(2), (4) Date: Aug. 5, 2004

(87) PCT Pub. No.: WO03/027034

PCT Pub. Date: Apr. 3, 2003

(65) Prior Publication Data

US 2004/0258929 A1    Dec. 23, 2004

(30) Foreign Application Priority Data

Sep. 21, 2001    (DE) ............................. 101 46 687

(51) Int. Cl.
B32B 9/00    (2006.01)
(52) U.S. Cl. .................. 428/428; 428/432; 428/312.6

(58) Field of Classification Search ............... 428/428, 428/446, 448
See application file for complete search history.

(56) References Cited

U.S. PATENT DOCUMENTS

| | | | |
|---|---|---|---|
| 4,775,520 A | 10/1988 | Unger et al. | 423/335 |
| 4,830,879 A | 5/1989 | Debsikdar | 427/162 |
| 5,394,269 A | 2/1995 | Takamatsu et al. | 359/580 |
| 6,177,131 B1 | 1/2001 | Glaubitt et al. | 427/162 |
| 7,241,505 B2 * | 7/2007 | Glaubitt et al. | 428/429 |
| 2001/0051213 A1 | 12/2001 | Schulz et al. | 427/162 |
| 2002/0014090 A1 * | 2/2002 | Tsujino et al. | 65/17.2 |
| 2002/0090519 A1 * | 7/2002 | Kursawe et al. | 428/428 |
| 2004/0028809 A1 | 2/2004 | Bein et al. | 427/240 |
| 2004/0028918 A1 | 2/2004 | Becker et al. | 428/448 |

FOREIGN PATENT DOCUMENTS

| | | |
|---|---|---|
| DE | 3534143 | 4/1987 |
| DE | 19642419 | 4/1998 |
| DE | 19828231 | 2/1999 |
| DE | 19918811 | 11/2000 |
| DE | 10051724 | 5/2002 |
| DE | 10052075 | 5/2002 |
| EP | 0 597 490 | 5/1994 |
| EP | 0 835 849 | 4/1998 |

* cited by examiner

Primary Examiner—Timothy M Speer
(74) Attorney, Agent, or Firm—Darby & Darby (57) ABSTRACT

A coated glass product includes a glass substrate and a porous antireflection surface coating including $SiO_2$-based particles having a first particle fraction including a first characteristic particle size range and a second particle fraction having a second characteristic particle size range that is different from the first characteristic particle size range. In addition, a method for producing the coated glass product is provided.

10 Claims, 3 Drawing Sheets

GLASS HAVING A POROUS ANTI-REFLECTION SURFACE COATING AND METHOD FOR PRODUCING SUCH GLASS

The present invention relates to a coated glass product including a glass substrate provided with a porous antireflection surface coating on the basis of $SiO_2$ particles. The present invention also relates to a method for the production of such a glass product as well as to uses the use of such a glass product.

BACKGROUND

When light passes through the interface of two media having different refractive indices, part of the radiation is reflected. For instance, when light falls perpendicularly upon a glass pane, the reflected fraction of incident light is about 4% due to the difference between its refractive index of n=1.5 and the refractive index of air of n=1. The same fraction of about 4% is also reflected when the light exits from the glass. Thus, at the maximum, an amount of 92% of the incident light passes through a conventional glass pane, which can cause an undesired loss of efficiency, especially when a glass pane is employed to cover solar collectors or other optically sensitive elements. For this reason, precisely when it comes to the covering of solar collectors, it is desirable to use so-called antireflection-coated glass in which the radiant transmittance of the glass in question is enhanced by means of a coating on the surfaces.

In order to render glass anti-reflective, multiple layers can be applied onto the surface. In this process, on the basis of the interference principle, alternating layers having high and low refractive indices are applied. Owing to interferences of the partial waves that are reflected on the appertaining interfaces between the materials having different refractive indices, these partial waves are extinguished within a certain wavelength range, so that a particularly high radiant transmittance can be achieved for these wavelengths. Such alternating layer systems, however, are wavelength-selective and thus not suitable for use in a broadband spectrum. As a result, such coated glass is not suited for covering, for example, solar collectors, where it is crucial to achieve the best possible passage of light within the entire solar spectrum.

An alternative for rendering glass anti-reflective consists of applying a single layer onto the glass surface in question. Here, for physical reasons, an especially high transmission can be achieved if the surface layer has a refractive index equal to the square root of the refractive index of glass, in other words, a refractive index of about 1.22. In this case, the reflection of light having a wavelength that is four times the layer thickness is virtually zero, so that light having this wavelength is transmitted completely. Owing to the comparatively flat functional wavelength-dependence of the radiant transmittance, however, the latter is still particularly high for wavelengths that diverge from this. For this reason, precisely in the case of glass for covering solar collectors or other optically sensitive elements, efforts are aimed at obtaining a coating with a material that has a refractive index that is as close to 1.22 as possible.

Such a surface coating for glass can be produced by selectively etching the glass. For instance, etching soda-lime glass, for example, with hydrofluoric acid or hexafluorosilicic acid, can yield surface layers having a refractive index of around 1.27 which already comes very close to the desired result. The surface layers produced in this manner, in addition to good optical properties, also have relatively good mechanical properties, especially a high mechanical resistance to abrasion. Therefore, glass produced in this way is also fairly well-suited for everyday use. This production method has the drawback, however, that it calls for the use of acids that are extremely harmful to the environment and aggressive, which then requires correspondingly complex disposal measures and commensurate precautions for handling such materials.

As an alternative, the glass can also be coated by means of an additive application of coating material. On the one hand, high requirements have to be produced of coated glass made in this manner in terms of its optical properties, particularly with respect to a relatively small refractive index that is as close to 1.22 as possible. On the other hand, high requirements also have to be made of the mechanical properties of the coating of these types of glass, especially their abrasion resistance, in order to render them suitable for everyday use, even under relatively harsh conditions. With an eye towards these requirements, antireflection surface coatings on the basis of $SiO_2$ particles have proven to be particularly well-suited.

In order to attain a suitably low refractive index of the surface layer that comes as close to n=1.22 as possible, the antireflection surface coatings on the basis of $SiO_2$ particles are normally porous since an acceptably lower refractive index can already be achieved by merely thinning the coating material with air. Such porous antireflection surface coatings on the basis of $SiO_2$ particles are normally characterized by more or less loose $SiO_2$ particles joined together and having an essentially uniform particle size.

When glass is coated with such a porous antireflective surface coating on the basis of $SiO_2$ particles, this is normally done using so-called sols in which $[SiO_x(OH)_y]_n$ particles are mixed with solvents and optionally with a stabilizer. On the basis of such sols, coating solutions can be prepared into which the glass to be coated can be dipped, as a result of which the layer-forming sol precipitates onto the surface of the glass.

German patent DE 199 18 811 A1 discloses the use of such a sol on the basis of an alcohol-water mixture for the production of a porous antireflection surface coating on the basis of $SiO_2$ particles. The antireflection surface coating produced here exhibits relatively good optical properties and is also sintering-stable so that the optical properties of an antireflection surface coating applied in this manner does not deteriorate to any appreciable extent, even during a subsequent thermal treatment of the coated glass, for example, in order to produce thermally toughened safety glass. However, for this coating, it has been found that the abrasion resistance does not meet the requirements for long-term use. For example, in the case of glass with such a porous antireflection surface coating, the test of the abrasion resistance according to DIN EN 1096-2 by means of the crockmeter test shows that marked damage to the layer already occurs after ten cycles and severe damage occurs after 100 cycles.

As an alternative, a porous antireflection surface coating on glass can also be produced using sols on the basis of aqueous systems that contain less than 1% organic components. The surface layers that can be produced by using such sols, which contain surfactants and which are essentially purely aqueous, increase the solar transmission of a low-iron soda-lime glass that is coated with such surface layers to as much as 95.3%, whereby the antireflection surface coating has a refractive index of 1.29. As it turned out, an antireflection surface coating produced in this manner is mechanically very stable and abrasion resistant, whereby the test of the abrasion resistance ascertained by means of the crockmeter test according to DIN EN 1096-2 revealed only slight changes to the layers even after 100 cycles. However, a drawback of antireflection surface coatings produced in this manner is that, due to the manufacturing process, the layers can exhibit inhomogeneities. Particularly in terms of visual appearance, crosswise streaking occurs that can be ascribed to periodical differences in the layer thickness within the range of a few nanometers. Such streaking can be detrimental. Moreover, the antireflection surface coatings that can be produced by using such an aqueous sol only yield unsatisfactory optical results when used for coating prism-cut glass, whereby the achievable radiant transmittance is only about 93.6%.

SUMMARY OF THE INVENTION

None of the above-mentioned antireflection surface coatings fully meet the stipulated requirements for a coating that is durable and that can be used for covering glass for solar collectors or other optically sensitive elements.

An object of the present invention is to provide a glass that has a porous antireflection surface coating on the basis of $SiO_2$ particles and that, on the one hand, has especially good optical properties in terms of a high radiant transmittance of light within the entire solar spectrum and, on the other hand, has a particularly high mechanical strength, especially a particularly high mechanical abrasion resistance. Moreover, a method for the production of such a glass as well as an especially advantageous use of the glass are to be proposed.

The present invention in that the antireflection surface coating on the basis of $SiO_2$ particles comprises at least two particle fractions that differ from each other in terms of their characteristic particle size.

In particular, the surface coating contains relatively large particles on the one hand, and relatively small particles on the other hand.

The invention is based on the consideration that the antireflection surface coating should be configured so as to be especially flexible in its structural composition because of the different requirements, namely, the good optical properties on the one hand and the high abrasion resistance on the other hand. In this context, the structural components or sub-components of the antireflection surface coating provided should be such that each one can be specifically optimized in order to meet one of the above-mentioned requirements. As was surprisingly found, the particle size of the $SiO_2$ particles is a suitable parameter for distinguishes between these different components that can each be optimized for a particular requirement.

In particular, relatively small $SiO_2$ particles have an especially high surface reactivity. Consequently, the $SiO_2$ particles with a relatively smaller particle size tend towards aggregation or agglomeration, which especially allows the formation of a layer of uniform thickness, especially in terms of any possible streak formation. Before this agglomeration occurs, the relatively small particles can be made available to the relatively large particles for purposes of reaction. In this manner, the surface of the relatively large $SiO_2$ particles is modified in such a way that they, too, tend to form layers having an especially homogeneous layer thickness. Such $SiO_2$ particles having relatively large dimensions, which can especially be present in the form of similar round beads or "monospheres", contribute to a great extent to the overall stability of the system, especially to the skeleton stability and to the adhesion of the surface layer to the underlying glass. It is precisely this combination of these $SiO_2$ particles that are kept relatively large with the $SiO_2$ particles that are kept relatively small that practically avoids a deterioration of the optical properties through the use of the $SiO_2$ particles that are kept relatively large.

The at least two particle fractions in the form of a binary or bimodal system having different characteristic particle sizes account, for example, for a particle size distribution in which the $SiO_2$ particles that make up the antireflection surface coating make especially significant contributions to at least two size ranges. Therefore, in this context, two particle fractions with different characteristic particle sizes are present when, for instance, the particle size distribution in two particle size intervals assumes recognizable large values, when the surface area integral under the particle size distribution is relatively large and/or when relative maxima occur in the particle size distribution. The characteristic particle size of each particle fraction can then be defined, for instance, by the maximum point in each particle size interval, by the mean value of the particle size distribution in each particle size interval or else by the mean value of the particle sizes in each particle size interval, whereby the particle size of the particles of each particle fraction can assume a certain distribution or bandwidth around each characteristic particle size.

As was surprisingly found, especially high-quality optical properties and especially a very homogeneous layer thickness with virtually no streaking can be achieved if the particles of the relatively small $SiO_2$ particle fraction have particle sizes amounting to a few nm. Consequently, the surface coating advantageously has a first particle fraction with particle sizes within the range from 4 nm to 15 nm.

As the second fraction, it is advantageous to have $SiO_2$ particles with a mean particle size of about 20 nm to 60 nm. Consequently, the surface coating in an alternative or additional advantageous embodiment has a second particle fraction with a mean particle size of 20 nm to 60 nm, whereby the standard deviation of the particle size distribution of this particle fraction is preferably 20% at the maximum.

Corresponding to the functional allocation of the particle fractions, relatively many $SiO_2$ particles having small dimensions are advantageously combined with relatively few $SiO_2$ particles having larger dimensions. In an especially advantageous embodiment, the surface coating has a ratio of the number of particles of the first fraction to the number of particles of the second fraction of 3000:1 to 100:1, preferably 1000:1 to 250:1.

In an advantageous embodiment, the coated class is configured as so-called toughened safety glass. Safety glass—in addition to having greater breaking strength—is characterized in that, if the glass breaks, it does not disintegrate into relatively large sharp-edged shards, but rather into a large number of relatively small, dull-edged fragments. Glass that is configured as such safety glass can be obtained by so-called thermal toughening, whereby the glass is first heated to temperatures of at least 600° C. [1112° F.] and subsequently thermally quenched, for example, by blowing air against it. The actual toughening process can be carried out with conventional toughening methods. In particular, the so-called vertical toughening technique, the so-called horizontal toughening technique in a continuous process, or the so-called horizontal toughening technique in an oscillation process can be used. For purposes of heating, the glass can be exposed to radiant heat and/or to convection heat in a kiln area, whereby temperatures of about 700° C. [1292° F.] are normally set in the kiln area. For purposes of toughening, the glass remains in the kiln area until the softening point has been reached. For example, glass having a thickness of about 4 mm is normally heated to at least 600° C. [1112° F.] for about 160 seconds. After this thermal treatment step, air nozzles arranged at regular intervals in an adjacent segment of a toughening installation blow air uniformly against both sides of the glass. Here, the glass is cooled off to temperatures as low as about 40° C. [104° F.]. Before the heated glass undergoes thermal quenching, it can also be subjected to a shaping process. For example, the heated glass can be bent prior to the quenching so as to obtain curved glass of the type used, for example, for car windshields.

Glass having the above-mentioned properties can be obtained especially advantageously in that a hybrid sol that has been specifically adapted to the properties that are to be achieved is advantageously precipitated onto a conventional soda-lime glass, but also, for instance, onto a borosilicate glass. The hybrid sol that is aimed at creating the porous antireflection surface coating advantageously comprises $[SiO_X(OH)_Y]_n$ particles, wherein $0<y<4$ and $0<x<2$, and whereby the particles comprise a first particle fraction having a first particle size range and a second particle fraction having a second particle size range, and said hybrid sol also contains water and 2% to 97% by weight of solvent, in a preferred embodiment it can contain 15% to 30% by weight of solvent, 40% to 70% by weight of stabilizer and 10% to 35% by weight of water. Therefore, the hybrid sol used for the production of the antireflection surface coating comprises a mixture of large and small $SiO_2$ particles, thus yielding the two coating fractions that are tailored for achieving the objectives when they are deposited onto the actual glass.

The hybrid sol can advantageously be obtained by hydrolytic polycondensation of a tetraalkoxysilane in an aqueous medium containing solvents, whereby a hydrolysis mixture with silicon oxide-hydroxide particles having a particle size of 4 nm to 15 nm is obtained, and by adding a monodispersed silicon oxide-hydroxide sol having a mean particle size of 20 nm to 60 nm and a standard deviation of 20% at the maximum, at a point in time of at least 5 minutes after the addition of the tetraalkoxysilane in the aqueous medium containing solvents.

The hybrid sol can thus essentially be prepared by a suitable combination of two different sols, whereby however, a simple mixture of these sol components is not sufficient to achieve the combination effect. In particular, the envisaged effect of the interaction of the particle fractions is dependent to a great extent on the selection of a suitable point in time for combining the relatively large $SiO_2$ particles with the relatively small, reactive $SiO_2$ particles.

In order to set properties that are especially favorable and well adapted to the needs, the particle size of the first fraction of particles of the hybrid sol is advantageously selected within the range from 4 nm to 15 nm. Advantageously, the second particle size averages 20 nm to 60 nm, with a standard deviation of 20%. The weight ratio of the small particle fraction to the large particle fraction in the hybrid sol is advantageously 25:1 to 1:5, preferably 10:1 to 2:1, especially preferably 3:1 to 2:1. The concentration of the $SiO_2$ particles in the hybrid sol is advantageously between 0.3% and 4% by weight, preferably between 1% and 2% by weight.

Examples of suitable solvents that can be used to prepare the hybrid sol include low aliphatic alcohols such as ethanol or i-propanol, but also ketones, preferably low dialkyl ketones, such as acetone or methylisobutyl ketone, ethers, preferably low dialkyl ethers such as diethylether or dibutylether, tetrahydrofuran, amides, esters, especially acetic acid ethylester, dimethyl formamide, amines, especially triethylamine and mixtures thereof.

In preferred embodiments, alcohols are used as solvents, especially ethanol, methanol, i-propanol, n-propanol. The amount of solvent employed is a function of the amount of the silicon compounds used as the starting material. The concentration of the solvents in the hybrid sol lies between 2% and 97% by weight, preferably at 15% to 30% by weight. As stabilizers in the hybrid sol, glycolethers or ethers of other alcohols having two or more hydroxy groups in a concentration of 10% to 95%, preferably 40% to 70% by weight can be used. Preference is given to the use of 1,2-propylene glycol monomethylether.

The present invention also provides a method for the production of a coated glass product in that a conventional soda-lime glass is coated with a coating solution containing the hybrid sol. The coated glass product may be subsequently subjected to a drying step. The drying preferably takes place under relatively constant climate conditions and is preferably carried out in atmospheric air at a temperature of about 20° C. [68° F.] to 25° C. [77° F.], advantageously at about 22° C. [71.6° F.], and at a relative humidity of 55% to 65%, advantageously of 60%.

As was surprisingly found after extensive tests, if the above-mentioned hybrid sol is used as the basic material for the coating of the glass and if the above-mentioned parameters are observed during the drying step, an antireflection surface coating can be created in the glass that, on the one hand, has at least two particle fractions; on the other hand, the coating produced in this manner, in addition to having good optical and good mechanical properties, also exhibits a special structural resistance and an especially high adhesion to the glass substrate, even without further after-treatment of the type that can be necessary, for example, for the thermal toughening of the glass that follows the actual coating.

The use of the above-mentioned hybrid sol as the starting material for the production of the antireflection surface coating ensures that the surface coating has a particle size distribution preferably entailing at least two ranges and configured so as to achieve the objective and meet the requirements. As comprehensive examinations have surprisingly shown, however, it is precisely the subsequent drying step, while observing the above-mentioned parameters, that causes the surface coating to have an especially high mechanical stability and an especially high-strength adhesion to the glass substrate, even without thermal after-treatment measures being necessary for this purpose. In contrast to the notion that had existed until now, namely, that, in order to crosslink the silicic acid network and to attain better adhesion to the substrate, a thermal treatment or temperature exposure is absolutely necessary when applying an antireflection surface coating on the basis of $SiO_2$ particles onto a glass substrate, this can now also be achieved without a further thermal treatment step.

This fact is particularly useful when such a coated glass is configured as safety glass that has undergone thermal toughening. Especially since there is no longer a need for a subsequent thermal treatment step in order to sufficiently harden the surface coating, the thermal toughening of the glass for the production of the safety glass can advantageously be carried out prior to the application of the antireflection surface coating. This especially allows the use of the so-called horizontal toughening technique in a continuous process, for example, during the production of toughened float glass, without any problem. The impressions that the rollers normally leave in the coating as a result of such a treatment of an already coated glass are thus reliably avoided when the coating process is carried out subsequent to the thermal toughening process.

Due to the especially high-quality optical properties, the glass is highly suitable to be used for covering a solar collector or a photovoltaic cell.

However, it is especially advantageous to use the glass in a window element of a greenhouse. This is so because precisely in a greenhouse, the overall transparency of the covering window, that is to say, the light transmission it can achieve, is of special importance. The reason is that the productivity in the cultivation of plants in a greenhouse depends to a great extent on an adequate supply of daylight so that normally a high optical transparency is particularly desirable in this case. In order to enhance this to a great degree, the covering window of a greenhouse is provided with a window base pane that, in an especially advantageous embodiment, is configured so as to have an especially high transparency or light transmission capability. For this purpose, the window base pane that is in the form of a glass pane advantageously has an antireflection surface coating of the above-mentioned type.

In order to attain an especially favorable light transmission capability in this application case, the glass pane advantageously has an antireflection surface coating with a refractive index of 1.25 to 1.40, advantageously 1.25 to 1.38.

As was also surprisingly found, coating a glass with a coating of the above-mentioned type causes the glass to have hydrophilic properties on its coated side. As a result, when moisture precipitates on such a coated glass, a wetting of the glass surface rather than drop formation tends to occur. Precisely for an application in a greenhouse, this is especially favorable since, if drops form on roof windows, the plants underneath could become wet, which is undesirable.

Through the use of the glass in a covering window as a skylight in a greenhouse, in case of precipitating moisture, a large surface area of the window surface becomes wet when moisture precipitates, so that the precipitating moisture runs along the window surface and can subsequently be drained in a controlled manner. This also prevents the light transmission from being impaired by light scatter resulting from the formation of drops. In order to utilize this aspect in an especially positive manner, in a particularly advantageous embodiment, the antireflection surface coating is applied onto the side of the glass pane that is intended as the inside of the greenhouse. Thus, the $SiO_2$ coating preferably faces the interior of the greenhouse, so that precipitating moisture can be drained in an especially reliable and controlled manner. Moreover, the glass pane of the covering window can, of course, also be provided with such a $SiO_2$ coating on both sides so that the total achievable radiant transmittance is particularly high.

Preferably, the covering window is used in a greenhouse, whereby the greenhouse is equipped with a number of window elements that make up the roof or side walls, at least one of which elements is configured as such a covering window.

The advantages that are achieved with the invention consist especially in that, through the at least two prevailing particle sizes in the antireflection surface coating in the form of a binary system or bimodal particle size distribution, a special flexibility can be achieved for systematically optimizing the coating with an eye towards the various specifications. Through the suitable selection of the particle sizes, the antireflection surface coating can be specifically adjusted in such a way as to have especially high-quality optical properties as well as particularly favorable mechanical properties, especially in terms of high abrasion resistance. The coated glass is advantageously used for covering solar energy systems, especially solar collectors, for car windshields, for windows or building glazing or else especially for covering greenhouses. In particular, an abrasion resistance according to DIN EN 1096-2 can be achieved, in which no damage of the coating could be ascertained, even after 100 cycles with a test weight of 400 grams. The antireflection surface coating also has an especially homogenous appearance without forming a perceptible streaky pattern. The antireflection surface coating can also be used for prism-cut glass or glass that is otherwise structured, while retaining its especially good optical properties.

BRIEF DESCRIPTION OF THE DRAWINGS

An embodiment of the present invention is explained in greater detail with reference to the drawings, in which the following is shown.

DETAILED DESCRIPTION

Identical parts are given the same reference numerals in all of the figures.

Figure 1:
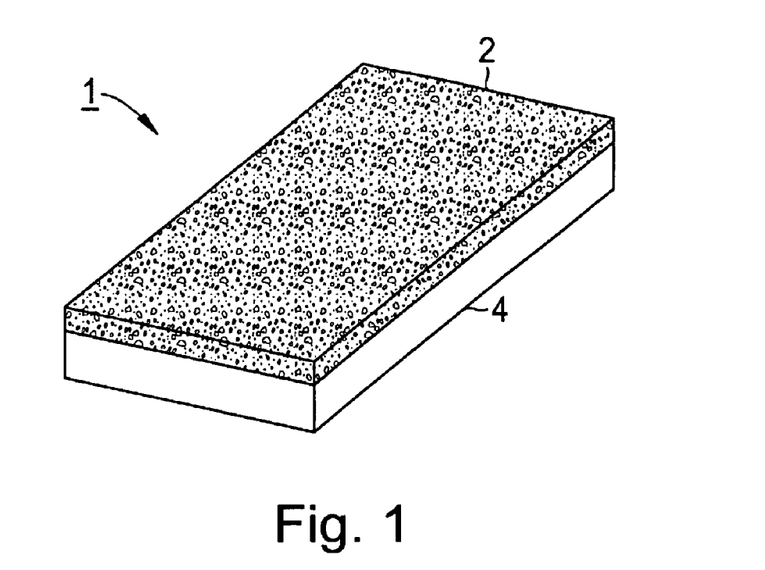
FIG. 1—in a schematic view, a glass with an antireflection surface coating.

The glass 1 according to FIG. 1 is intended for use as a covering glass for a solar collector, for a photovoltaic module or as a covering window in a greenhouse. In order to achieve a particularly high efficiency for the solar collector or for the photovoltaic module and to allow an especially favorable operation of the greenhouse, the glass 1 is designed for a particularly high broadband light transmission, whereby efforts are aimed at achieving a relatively high transmission for essentially all wavelengths within the solar spectrum. In order to make this possible, the glass 1 has a porous antireflection surface coating 2 on the basis of $SiO_2$ particles—advantageously on both sides—which has been applied onto a glass substrate 4. The high radiant transmittance here is achieved by selecting the refractive index of the antireflection surface coating 2 as close as possible to the square root of the refractive index of glass, that is to say, as close as possible to $n=1.22$. Furthermore, the antireflection surface coating 2 is configured in such a way that it is particularly well-suited for everyday use and, moreover, has an especially high abrasion resistance.

Figure 2:
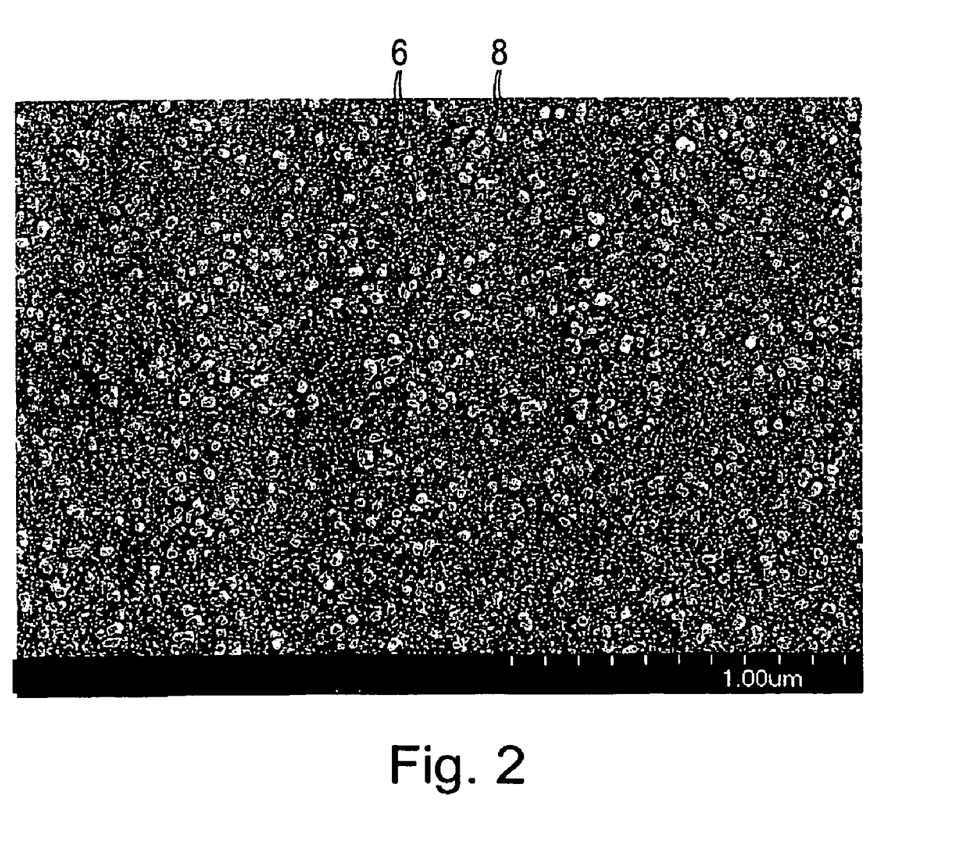
FIG. 2—in a top view, the coated surface of the glass according to FIG. 1.

These two criteria and also an optically homogeneous appearance of the antireflection surface coating 2 are ensured in the embodiment by a specific configuration of the antireflection surface coating 2 in terms of the $SiO_2$ particles of which it consists. In fact, the antireflection surface coating 2 encompasses, in the form of two subsystems, a combination of a first fraction of $SiO_2$ particles with a second fraction of $SiO_2$ particles, whereby these two fractions differ from each other in terms of their particle size. Here, the first fraction comprises $SiO_2$ particles having a particle size within the range from about 4 nm to 15 nm, whereas the second fraction has $SiO_2$ particles with a mean particle size of about 35 nm, with a standard deviation of 20% at the maximum. These fractions can be seen in the top view in FIG. 2. As can be seen in FIG. 2, which is a REM image of the glass 1, the antireflection surface coating 2 has essentially the following structures:

As a first fraction, there is a supramolecular network 6 consisting of small $SiO_2$ particles having a mean particle size of 4 nm to 15 nm. As the second fraction, there are spherical $SiO_2$ particles 8 having a mean particle size of 20 nm to 60 nm embedded into this supramolecular network 6. The combination of these two fractions results in a high abrasion resistance as well as a particularly esthetical appearance of the layer.

Figure 3:
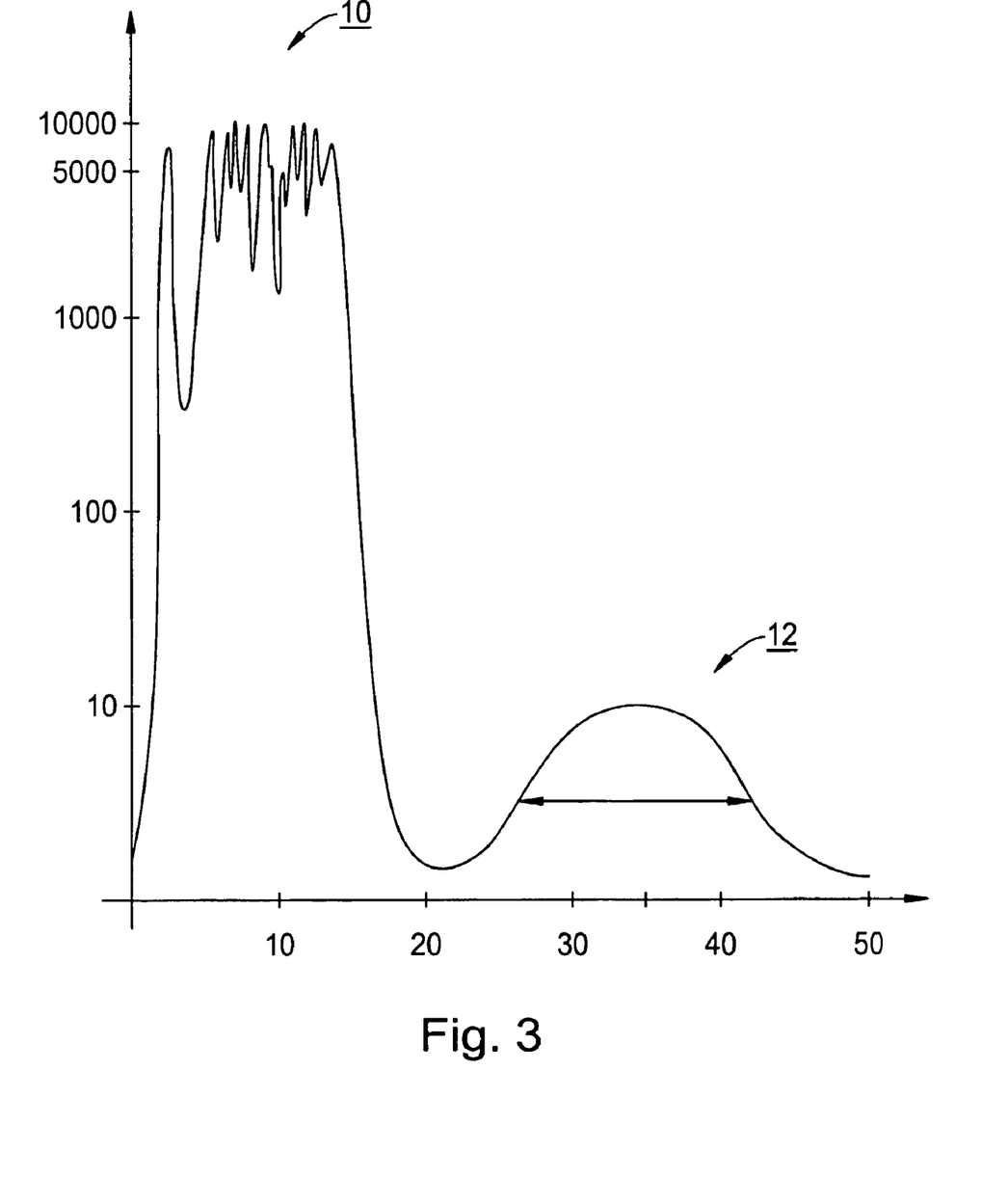
FIG. 3—in a diagram, the particle size distribution of the surface coating of the glass according to FIG. 1.

Accordingly, the antireflection surface coating 2 in the present embodiment exhibits a particle size distribution of the kind schematically shown in the diagram in FIG. 3. The particle size distribution has a first particle size range 10 between about 4 nm and about 15 nm which is occupied by a relatively large number of particles. This particle size range 10, to which, for example, the mean value of the occupied interval, in other words, a value of about 10 nm, can be ascribed as the first characteristic particle size, is defined by particles of the first particle fraction.

In addition, the particle size distribution according to FIG. 3 has a second particle size range 12 which is likewise occupied by a significant number of particles and in which the particle size distribution in the embodiment can be described approximately by a Gaussian distribution having a standard deviation of about 15%. The maximum of the Gaussian distribution, that is to say, a value of about 35 nm, can be ascribed, for example, to the particle size range 12 as the second characteristic particle size.

The systematic combination of the two fractions of $SiO_2$ particles comes to the fore particularly well as a result of the particle size ranges 10, 12. On the basis of the logarithmic depiction of the diagram in FIG. 3, it can also be seen that the number of particles belonging to the first particle fraction predominates by far over the number of particles belonging to the second particle fraction. In the embodiment, the ratio of the number of particles of the first particle fraction to the number of particles of the second particle fraction is about 500.

In order to produce the glass 1, the glass substrate 4 is first coated with a hybrid sol that is geared specifically towards the preparation of the surface coating 2, which contains at least two components. The hybrid sol, in turn, is produced in the following manner.

First of all, a tetraalkoxysilane in placed into an aqueous medium containing solvents, in response to which hydrolytic polycondensation sets in. The process is carried out essentially as described in German patent DE 196 42 419 under thorough mixing. If applicable, for the hydrolytic polycondensation, a basic catalyst that shortens the reaction times can be added to this mixture. The use of ammonia is preferred.

The solvents contained in the hydrolysis mixture can be selected from the above-mentioned solvents. Preference is given to the use of ethanol, methanol, i-propanol or n-propanol, while ethanol is especially preferred.

The hydrolysis takes place at temperatures ranging from 5° C. to 90° C. [41° F. to 194° F.], preferably from 10° C. to 30° C. [50° F. to 86° F.]. In this context, the tetraalkoxysilane employed yields the small silicon oxide-hydroxide particles with a particle size ranging from 4 nm to 15 nm.

After the addition of the tetraalkoxysilane, the hydrolysis mixture is thoroughly stirred, for example, by means of agitation, for a period of at least 5 minutes.

Subsequently, a sol consisting of monodispersed silicon oxide-hydroxide particles having a mean particle size of 20 nm to 60 nm and a standard deviation of 20% at the maximum is added to the hydrolysis mixture described above. The time until the silicon oxide-hydroxide sol consisting of monodispersed particles is added to the hydrolysis mixture depends on the use of condensation catalysts for the hydrolytic condensation of the silicon compounds. At the earliest 5 minutes after the addition of the tetraalkoxysilane to the aqueous hydrolysis mixture containing solvents, the monodispersed silicon oxide-hydroxide sol is added to this mixture. The point in time of this addition can be delayed by up to 48 hours after the addition of the tetraalkoxysilane to the hydrolysis mixture. Preferably, this point in time lies between 5 minutes and 24 hours after the beginning of the formation of silicon oxide-hydroxide particles having a particle size ranging from 4 nm to 15 nm. Special preference is given to time frame of 20 to 80 minutes after the start of the reaction.

If the point in time of the addition is postponed for more than 48 hours after the start of the reaction, differences in the properties of the hybrid sol can no longer be detected in comparison to an addition within 48 hours.

The point in time of the addition of the silicon oxide-hydroxide sol consisting of monodispersed particles to the hydrolysis mixture determines to a decisive extent the properties of the hybrid solution according to the invention. In this manner, a statistical distribution of the monodispersed particles in the small silicon oxide-hydroxide particles is achieved and an accumulation of the monodispersed particles in the sense of a "formation of islands" is avoided since the latter would lead to worse abrasion stability.

The monodispersed silicon oxide-hydroxide sol is preferably added to the hydrolysis mixture in one portion.

In a special embodiment, the silicon oxide-hydroxide sol consisting of monodispersed particles is produced in accordance with the method described in U.S. Pat. No. 4,775,520. For this purpose, the tetraalkoxysilane is placed into an aqueous-alcoholic-ammoniacal hydrolysis mixture and thoroughly mixed, thus producing primary silicon oxide-hydroxide particles. Any hydrolysable silicic acid orthoesters of aliphatic alcohols can be employed without problems as suitable tetraalkoxysilanes. First and foremost, the best options here are the esters of aliphatic alcohols having 1 to 5 carbon atoms such as, for instance, methanol, ethanol, n-propanol or i-propanol as well as the isomeric butanols and pentanols. These can be employed individually as well as in a mixture. Preference is given to the silicic acid orthoesters of the $C_1$-$C_3$ alcohols, especially tetraethoxysilane. Suitable alcohol components are aliphatic $C_1$-$C_5$ alcohols, preferably $C_1$-$C_3$ alcohols such as methanol, ethanol and n-propanol or i-propanol. They can be present in the mixture individually as well as in a mixture. The tetraalkoxysilane is preferably added to the mixture in one portion, whereby the reactant can be present in pure form or in a solution in one of the above-mentioned alcohols. A concentration of tetraalkoxysilane in the reaction mixture of between about 0.01 mol/l and about 1 mol/l can be chosen in order to create the primary silicon oxide-hydroxide particles. Once the reactants have been combined, the reaction sets in immediately or after a few minutes, which is evident in that the reaction mixture soon becomes opalescent due to the particles that are formed.

The hydrolysis mixture containing primary silicon oxide-hydroxide particles is subsequently continuously mixed with additional tetraalkoxysilane in such a way that essentially no new silicon oxide-hydroxide particles are formed. Rather, the primary silicon oxide-hydroxide particles already present grow to form larger, monodispersed particles.

Depending on the selection of reactants as well as on their concentration in the reaction mixture, particles can be obtained having a mean particle size between 20 nm and 60 nm and with a standard deviation of 20% at the maximum.

It has proven to be advantageous to conduct the reaction to produce these particles at a high temperature. Favorable temperatures in this context are those between 35° C. and 80° C. [95° F. and 176° F.], preferably between 40° C. and 70° C. [104° F. and 158° F.]. It turned out that the particle size scatter decreases at an elevated temperature, although the mean particle size also does. At lower temperatures, that is to say, at around room temperature, larger particles with a larger size scatter are obtained under otherwise identical conditions.

A further increase in the stability of the monodispersed silicon oxide-hydroxide sol might necessitate the removal of the alcohol and/or ammonia from the sol. This is done on the basis of known techniques according to the state of the art, for example, by raising the temperature in order to remove the volatile ammonia.

Here, the term monodispersed refers to particles that exhibit a standard deviation of 20% at the maximum, especially 15% at the maximum and especially preferably 12% at the maximum, and that are essentially present as discrete particles.

Under thorough mixing, for instance, by means of agitation, the silicon oxide-hydroxide sol consisting of monodispersed particles is added to the hydrolysis mixture. At temperatures ranging from 10° C. to 40° C. [50° F. to 104° F.], this thorough mixing is continued over a period ranging from 1 minute to 48 hours, preferably from 10 minutes to 5 hours.

In the subsequent stage of the process for the production of the hybrid sol, a stabilizer can be added to the hybrid sol. Examples of stabilizers are glycol ether or ethers of other alcohols. Preference is given to the use of 1,2-propylene glycol-1-monomethyl ether. Subsequently, the stabilized sol mixture is thoroughly mixed over a period ranging from 1 minute to 24 hours, preferably from 5 minutes to 1 hour.

If necessary, the hybrid sol thus formed can be subsequently filtered. In this case, the filtration through a conventional filter, preferably with a pore size of 1 µm to 5 µm, yields the desired sol which can then be used for further processing.

In particular, the hybrid sol can be produced according to the following examples:

EXAMPLE 1

29.4 grams of an aqueous 0.08 n ammonium hydroxide solution are completely mixed with 380 grams of ethanol and 50.7 grams of tetramethoxysilane are added while being stirred. After a stirring time of 150 minutes, 400 grams of a 5%-monodispersed silicon oxide-hydroxide sol containing silicon oxide-hydroxide particles with a mean particle size of 25 nm are added and stirred for another 60 minutes until 970 grams of 1,2-propylene glycol monomethyl ether are added to the batch. The hybrid sol thus produced is subsequently filtered through a fiberglass prefilter.

EXAMPLE 2

25.4 grams of polyethylene glycol having a mean molecular weight of 200 g/mol are dissolved in a mixture consisting of 29.4 grams of 0.08 n aqueous ammonium hydroxide and 357 grams of ethanol. Then 50.8 grams of tetramethoxysilane are added to this solution while being stirred. After a stirring time of 125 minutes, 400 grams of a 5%-monodispersed silicon oxide-hydroxide sol containing silicon oxide-hydroxide particles with a mean particle size of 25 nm are added and stirred for another 30 minutes until 1300 grams of 1,2-propylene glycol monomethyl ether are added to the batch. The hybrid sol thus produced is subsequently filtered through a fiberglass prefilter.

The hybrid sol thus obtained is applied onto the glass substrate 4 in order to produce the glass 1. For this purpose, the hybrid sol can be present in a coating solution into which the glass substrate 4 is dipped. Instead of such dip-coating, however, it is also possible to employ a spraying method or a rotary coating method, also called spin coating.

For example, as the glass substrate 4, a glass pane that measures approximately 1 meter by 1 meter and has a thickness of 4 mm and that has previously been cleaned with demineralized water and subsequently dried can be dipped into the coating solution. The glass pane is removed from the coating solution at a constant withdrawal speed of 5.5 mm/sec. The glass substrate 4 coated in this manner is subsequently subjected to a drying step in atmospheric air. For this purpose, the coated glass substrate 4 is dried at a temperature of about 22° C. [71.6° F.] and at a relative humidity of about 60%. This drying procedure can be done by simply letting the glass substrate stand exposed to the air or else by blowing air against it. As has been found, an abrasion-resistant surface coating 2 having very good optical properties and a special mechanical stability is already obtained after this drying step and this coating exhibits approximately the pattern shown in the top view in FIG. 2, in other words, especially a combination of two particle fractions with mean particle sizes that can be clearly differentiated from each other. In particular, there is no need for any additional thermal treatment of the thus obtained coated glass 1 in order to achieve sufficient mechanical stability or abrasion resistance.

The glass 1 is configured as a toughened safety glass. Due to the especially favorable properties of the surface coating 2, which in fact does not require any additional thermal treatment after the actual coating procedure, the thermal toughening is already carried out on the uncoated glass substrate 4. However, the toughening could also be performed after the coating procedure.

A commonly employed toughening method is used for the toughening whereby this can be a vertical toughening technique, a horizontal toughening technique in a continuous process or also a horizontal toughening technique in an oscillation process. In any case, the glass substrate 4 is heated up to a temperature of 700° C. [1292° F.] in a kiln area, whereby radiant heat and/or convection heat can be employed. Here, the glass substrate 4 remains in the kiln area until the softening point has been reached. The glass substrate 4, having a thickness of 4 mm, is heated, for instance, to at least 600° C. [1112° F.] for about 160 seconds. Subsequently, the heated glass substrate 4 is quenched whereby, for example, air nozzles arranged at regular intervals blow air uniformly against both sides of the glass substrate 4. In this process, the glass substrate 4 is cooled off as low as 40° C. [104° F.].

During this thermal pre-treatment for toughening purposes, the glass substrate 4 can also undergo a shaping process, for instance, it can be bent. In the case of glass 1 that has not yet been coated, after completion of the toughening procedure, the glass substrate 4 is then coated with the surface layer 2 in the manner described.

Figure 4:
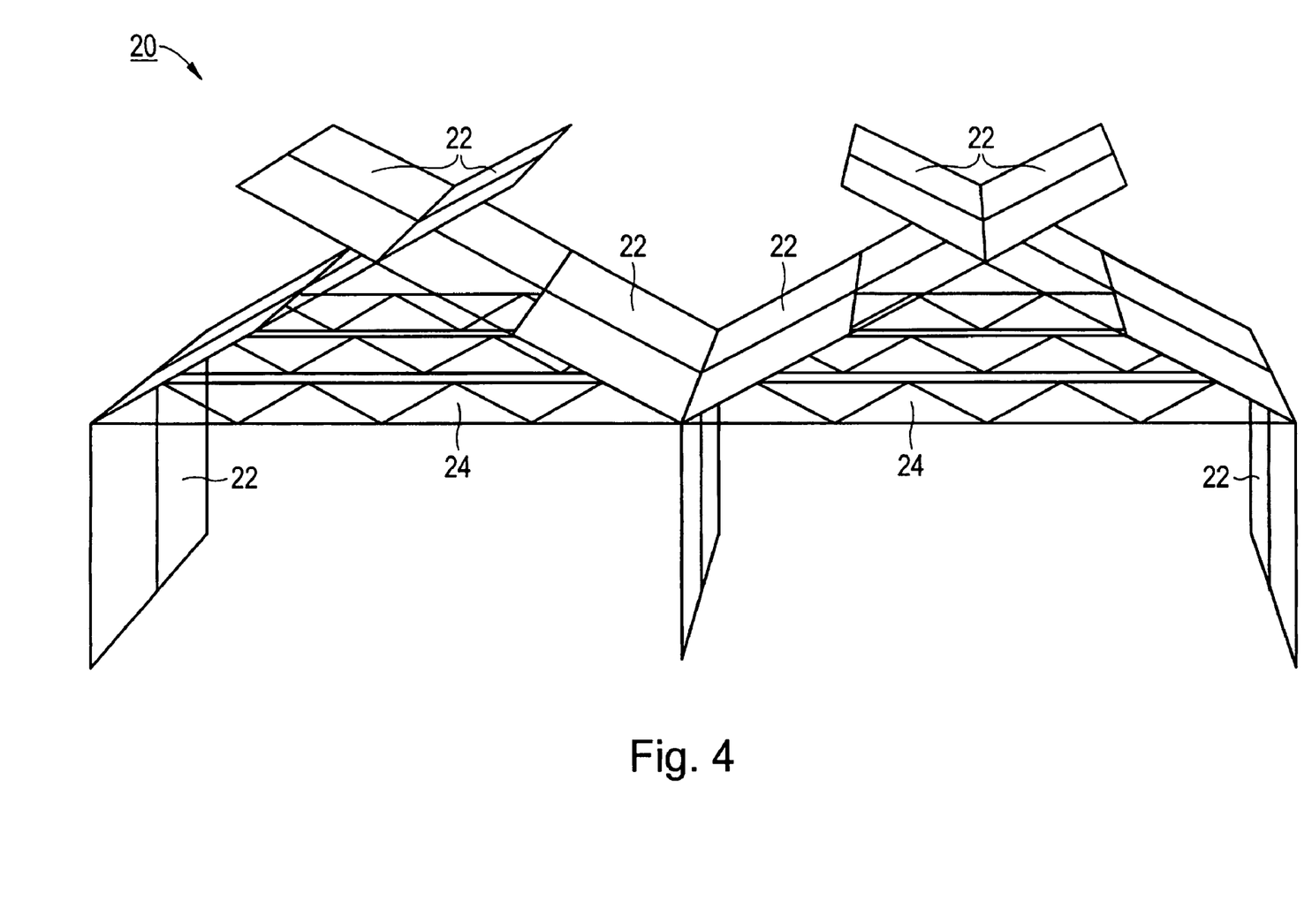
FIG. 4—schematically, a greenhouse with a number of window elements.

The glass 1 produced, thermally toughened and coated in this manner is particularly well-suited for use as a covering for a solar collector, for a photovoltaic module or for other optically sensitive elements although it can also be used in covering windows for a greenhouse 20, as schematically shown in FIG. 4. The greenhouse 20 according to FIG. 4 comprises a number of window elements 22 that form the roof or the side walls and that, in their entirety, form the outer wall of the greenhouse 20; depending on the application purpose, they can be configured as fixed or tilting elements. For purposes of mechanical stabilization, the window elements 22 are held by a support frame 24; as an alternative, however, the window elements 22 can also be configured in form of a self-supporting structure that dispenses with a tubular frame of its own.

Different requirements can be made of the transparency of the individual components when it comes to the enveloping or outer surface area of the window elements 22 that form the greenhouse 20, and the same applies to their corresponding use in other buildings or in technical devices such as, for example, solar collectors. For instance, depending on the time of day or the season of the year, these requirements can vary. Moreover, especially in the case of covering window materials for greenhouses and solar collectors, the highest possible transparency is usually expected. This is why the window elements 22 are designed to have an overall particularly high transparency that allows an especially high yield of daylight inside the greenhouse 20 and thus a particularly low product-specific energy consumption for the cultivation of plants.

For this purpose, the or each window element 22 is provided with a glass plate as the window base pane which is configured as an antireflection-coated glass 1. The window base pane here is configured as a thermoset safety glass. Here, the $SiO_2$ coatings have a refractive index of about 1.25 that allows a particularly high level of transparency to be set.

What is claimed is:

1. A coated glass product comprising:
   a glass substrate; and
   a porous antireflection surface coating including $SiO_2$-based particles having a first particle fraction including a first characteristic particle size range of 4 nm to 15 nm and a second particle fraction having a second characteristic particle size range of 20 nm to 60 nm.

2. The coated glass product as recited in claim 1, wherein the first fraction includes a first number of particles and the second fraction includes a second number of particles, and wherein a ratio of the first number of particles to the second number of particles is 3000:1 to 100:1.

3. The coated glass product as recited in claim 2, wherein the ratio is 1000:1 to 250:1.

4. The coated glass product as recited in claim 1, wherein the coated glass product is configured as a toughened safety glass.

5. The coated glass product as recited in claim 1, wherein the surface coating includes a hybrid sol comprising 2% to 50% by weight of water, 2% to 97% by weight of solvent, and 0.3% to 4% by weight of $[SiO_x(OH)_y]_n$ particles, wherein $0<y<4$ and $0<x<2$, and wherein the glass substrate includes conventional soda-lime glass.

6. The coated glass product as recited in claim 5, wherein which the hybrid sol is obtainable from a hydrolytic polycondensation of a tetraalkoxysilane in an aqueous medium containing solvents.

7. The coated glass product as recited in claim 1, wherein the coated glass product is part of at least one of a solar collector, a photovoltaic cell, and a greenhouse.

8. The coated glass product as recited in claim 7, wherein the antireflection surface coating has a refractive index of 1.25 to 1.40.

9. The coated glass product as recited in claim 7, wherein the antireflection surface coating has a refractive index of 1.25 to 1.38.

10. The coated glass product as recited in claim 7, wherein the coated glass product is part of a greenhouse and the antireflection surface coating is disposed on a surface of the glass substrate facing an inside of the greenhouse.

* * * * *

UNITED STATES PATENT AND TRADEMARK OFFICE
CERTIFICATE OF CORRECTION

PATENT NO. : 7,575,809 B2  Page 1 of 1
APPLICATION NO. : 10/490172
DATED : August 18, 2009
INVENTOR(S) : Glaubitt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Seventh Day of September, 2010

David J. Kappos
*Director of the United States Patent and Trademark Office*